United States Patent
Kanai et al.

(10) Patent No.: US 11,431,551 B2
(45) Date of Patent: Aug. 30, 2022

(54) MULTIPLEXING DEVICE, WORKING MACHINE, AND COMMUNICATION DISCONNECTION METHOD

(71) Applicant: FUJI CORPORATION, Chiryu (JP)

(72) Inventors: Hidekazu Kanai, Chiryu (JP); Nobuo Nagasaka, Okazaki (JP); Kenji Watanabe, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 16/958,880

(22) PCT Filed: Jan. 15, 2018

(86) PCT No.: PCT/JP2018/000773
§ 371 (c)(1),
(2) Date: Jun. 29, 2020

(87) PCT Pub. No.: WO2019/138568
PCT Pub. Date: Jul. 18, 2019

(65) Prior Publication Data
US 2020/0344114 A1 Oct. 29, 2020

(51) Int. Cl.
*G06F 15/16* (2006.01)
*H04L 41/0654* (2022.01)
(Continued)

(52) U.S. Cl.
CPC ...... *H04L 41/0654* (2013.01); *G05B 19/4185* (2013.01); *H04L 67/143* (2013.01); *G05B 2219/31449* (2013.01)

(58) Field of Classification Search
CPC .............. H04L 41/0654; H04L 67/143; G05B 19/4185; G05B 2219/31449
(Continued)

(56) References Cited

U.S. PATENT DOCUMENTS 5,136,587 A * 8/1992 Obana ............... H04J 3/1611
370/514
5,161,151 A * 11/1992 Kimura ............... H04L 1/24
340/3.1
(Continued)

FOREIGN PATENT DOCUMENTS

JP 2018-42128 A 3/2018
WO WO 2016/142999 A1 9/2016

OTHER PUBLICATIONS

International Search Report dated Mar. 27, 2018 in PCT/JP2018/000773 filed on Jan. 15, 2018, 1 page.

*Primary Examiner* — Bharat Barot
(74) *Attorney, Agent, or Firm* — Oblon, McClelland, Maier & Neustadt, L.L.P.

(57) ABSTRACT

A multiplexing device including a multistage slave configured to process control data transmitted from a master in an industrial network, a multiprocessing device configured to multiplex the control data transmitted from a first slave of the multistage slave, the first slave being disposed at an upstream side to the master of the multistage slave, and transmit the control data so multiplexed to a second slave of the multistage slave by way of a multiplex communication line, the second slave being situated at a downstream side of the multistage slave, and a control device configured to issue a disconnection command to disconnect a communication between the first slave and the multiprocessing device in response to a disconnection of the multiplex communication line.

10 Claims, 8 Drawing Sheets

(51) Int. Cl.
*G05B 19/418* (2006.01)
*H04L 67/143* (2022.01)

(58) Field of Classification Search
USPC .................................. 709/208–210; 370/216
See application file for complete search history.

(56) References Cited

U.S. PATENT DOCUMENTS

| | | | |
|---|---|---|---|
| 8,340,047 B2* | 12/2012 | Nakano | H04B 1/0007 370/331 |
| 9,590,756 B2* | 3/2017 | Caggioni | H04J 3/1664 |
| 2014/0355619 A1* | 12/2014 | Fukuda | H04L 12/40156 370/428 |
| 2017/0163440 A1* | 6/2017 | Borkhuis | H04L 12/423 |
| 2018/0048714 A1* | 2/2018 | Kanai | G05B 19/41855 |
| 2019/0033834 A1* | 1/2019 | Xu | G05B 19/4185 |
| 2020/0324418 A1* | 10/2020 | Nagasaka | H04L 49/602 |

* cited by examiner

MULTIPLEXING DEVICE, WORKING MACHINE, AND COMMUNICATION DISCONNECTION METHOD

TECHNICAL FIELD

The present disclosure relates to a multiplexing device to which an industrial network connects, a working machine using the multiplexing device which transmits data relating to the work, and a communication disconnection method for disconnecting the communication in the multiplexing device.

BACKGROUND ART

Network communication technologies, represented by the Internet, are also used in the field of factory automation (FA) and are referred to as an industrial network designed for the FA field. For example, in an electronic component mounting device described in Patent Literature 1 below, work-related data is transmitted by use of the industrial network technology. As one form of control in the industrial network, for example, a slave and a master, configured to supervise and control the slave, are installed. The slave controls sensors, relays, switches, and the like which are attached to the electronic component mounting device based on control data transmitted from the master by way of the industrial network. In the electronic component mounting device described in Patent Literature 1, control data processed by the slave is multiplexed by use of a multiprocessing device and is then transmitted to the master or another slave by way of a multiplex communication line.

PATENT LITERATURE

Patent Literature 1: International Publication No. WO2016/142999

BRIEF SUMMARY

Technical Problem

Incidentally, for example, in the case that the multiplex communication line is disconnected while power is kept supplied to the electronic component mounting device for the maintenance thereof or the like, the multiprocessing device needs a certain length of time before it detects the disconnection of the multiplex communication line. In this case, in the event that detecting a disconnection of the multiplex communication line is delayed, there is a possibility that the control data is kept transferred between the multiprocessing device and the slave.

On the other hand, the multiprocessing device transmits the control data received by way of the multiplex communication line to the slave until the multiprocessing device detects the disconnection of the multiplex communication line. As a result, for example, in the event that an error is generated in the control data due to the disconnection of the multiplex communication line, there is a possibility that the control data, in which the error is occurring, is transmitted from the multiprocessing device to the slave and then to the master.

This patent application has been made in view of the problem described above, and an object thereof is to provide a multiplexing device configured to disconnect properly a communication between a multiprocessing device and a slave in response to a disconnection of a multiplex communication line, a working machine including the multiplexing device, and a communication disconnection method.

Solution to Problem

In order to solve the problem described above, according to the present disclosure, there is provided a multiplexing device including:

a multistage slave configured to process control data transmitted from a master in an industrial network;

a multiprocessing device configured to multiplex the control data transmitted from a first slave of the multistage slave, the first slave being situated at an upstream side or a side closer to the master of the multistage slave, and transmit the control data so multiplexed to a second slave of the multistage slave by way of a multiplex communication line, the second slave being situated at a downstream side of the multistage slave; and a control device configured to issue a disconnection command to disconnect a communication between the first slave and the multiprocessing device in response to a disconnection of the multiplex communication line. When referred to herein, the "industrial network" is a network for transmitting control data for controlling relays, switches, and the like by use of communication standards such as EtherCAT (a registered trademark), MECHATROLINK (a registered trademark)-III, Profinet (a registered trademark), and the like.

Additionally, the contents of this patent application are not limited to the multiplexing device but can also be applied to a working machine in which work-related data is transmitted by the multiplexing device, and a method for disconnecting a communication in the multiplexing device.

Advantageous Effects

According to the multiplexing device and the like of the present disclosure, the communication between the first slave and the multiprocessing device can be disconnected before the disconnection of the multiplex communication line is started. As a result, for example, even in the event that an error is generated in the control data due to the disconnection of the multiplex communication line, the control data in which the data error is generated can be suppressed from being transmitted from the multiprocessing device to the first slave.

DESCRIPTION OF EMBODIMENT (Configuration of Electronic Component Mounting Device 10)

Figure 1:
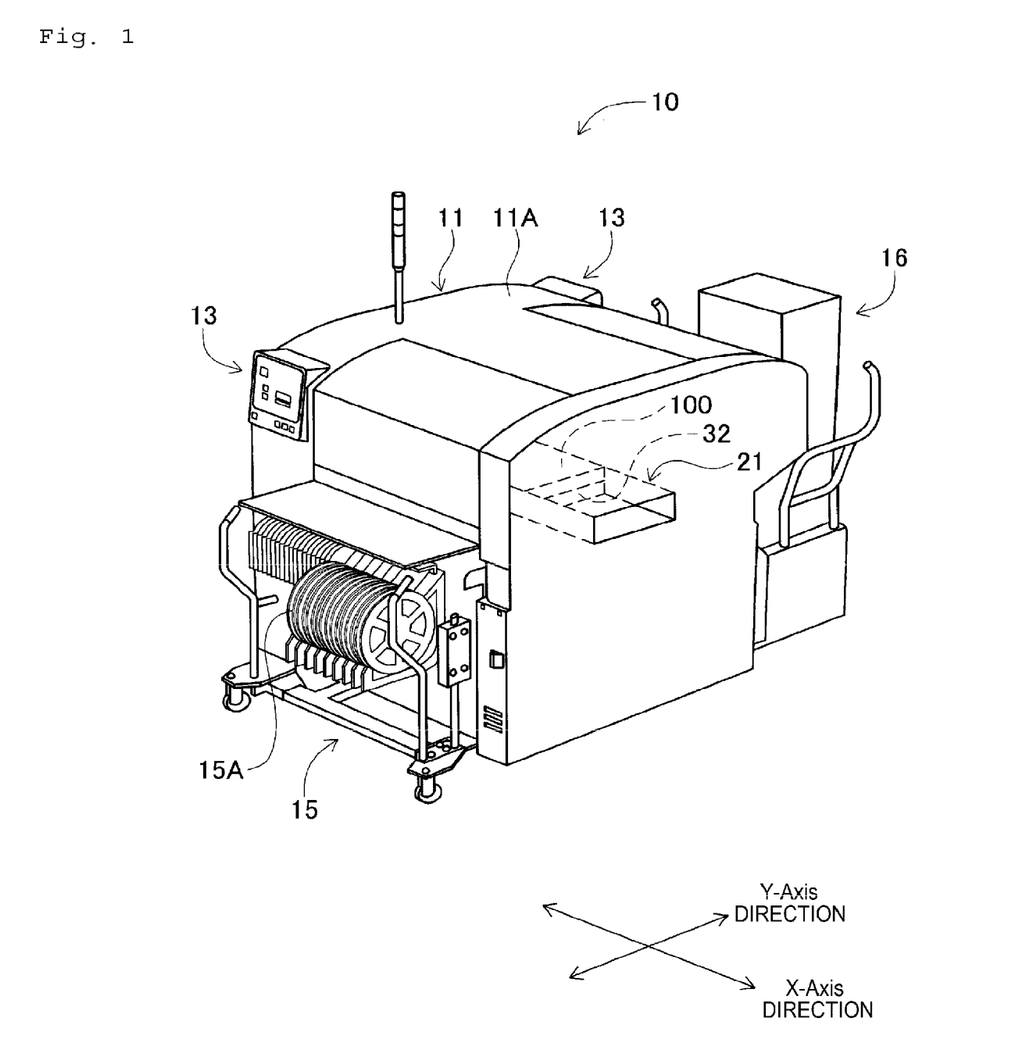
FIG. 1 is a perspective view of an electronic component mounting device of an embodiment of the present disclosure.

Hereinafter, an embodiment of the present patent application will be described by reference to drawings. Firstly, as an example of a working machine to which a multiplexing device of the present patent application is applied, an electronic component mounting device (hereinafter, referred to simply as a "mounting device" from time to time) will be described. As shown in mounting device 10 includes device mounting device 11, pair of display devices 13 which are provided integrally on device main body 11, and supply devices 15, 16 which are detachably provided on device main body 11, In this embodiment, mounting device 10 is a device designed to execute mounting work of mounting an electronic component (an example of a workpiece) on circuit board 100 conveyed by conveyance device 21 installed in device main body 11 based on a control by CPU 61 shown in FIG. 3. In this embodiment, as shown in FIGS. 1 and 2, a direction in which circuit board 100 is conveyed by conveyance device 21 (a left-right direction in FIG. 2) will be referred to as an X-axis direction, a direction which is horizontal with respect to the conveyance direction of circuit board 100 and is normal to the X-axis direction will be referred to as a Y-axis direction, and a direction normal to the X-axis direction and the Y-axis direction will be referred to as a Z-axis direction.

Pair of display devices 13 are provided individually at both sides of device main body 11 in the Y-axis direction. Each display device 13 is a touch panel-type display device and is configured to display information relating to mounting work of electronic components. Supply devices 15, 16 are mounted on device main body 11 in such a manner as to hold the device main body 11 therebetween in the Y-axis direction. Supply device 15 is a feeder-type supply device and has multiple tape feeders 15A each storing one type of taped electronic components which are wound round a reel therein. Supply device 16 is a tray-type supply device and has multiple component trays 16A (refer to FIG. 2) on each of which multiple electronic components of one type are rested.

Figure 2:
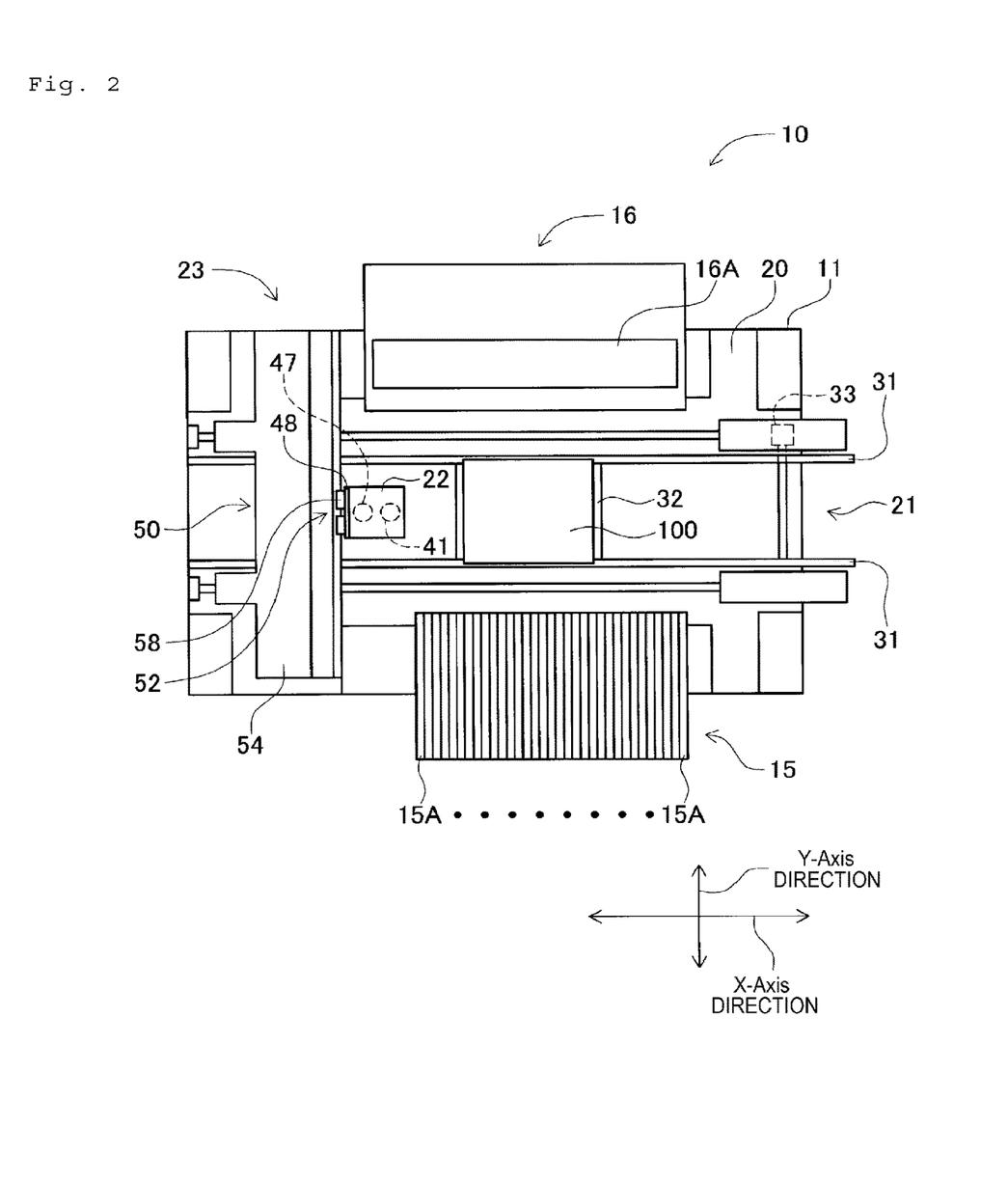
FIG. 2 is a schematic plan view of the electronic component mounting device with an upper cover thereof removed.

FIG. 2 is a schematic plan view showing mounting device 10 as viewed from a viewpoint lying over the mounting device in the Z-axis direction (an upper side in FIG. 1) with upper cover 11A (refer to FIG. 1) of device main body 11 removed therefrom. As shown in FIG. 2, device main body 11 includes on device main body section 20 conveyance device 21 described above, head section 22 for mounting electronic components on circuit board 100, and moving device 23 for moving head section 22.

Conveyance device 21 is provided at a substantially central portion of device main body section 20 in the Y-axis direction and has pair of guide rails 31, board holding device 32 held to guide rails 31, and electromagnetic motor 33 for moving board holding device 32. Board holding device 32 holds circuit board 100. An output shaft of electromagnetic motor 33 is coupled to a conveyor belt, which is provided to stretch sideways to sides of guide rails 31 therebetween, in such a manner as to drive the conveyor belt. Electromagnetic motor 33 is, for example, a servomotor which can control a rotation angle accurately. Conveyance device 21 is driven by electromagnetic motor 33 in such a way as to move the conveyor belt circularly and moves circuit board 100 in the X-axis direction together with board holding device 32.

Head section 22 has multiple suction nozzles 41, each being configured to pick up a corresponding electronic component, on a lower surface thereof which lies to face circuit board 100. Suction nozzles 41 communicate with a negative pressure air passageway and a positive pressure air passageway by way of an electromagnetic valve of a positive and negative pressure supply device (not shown) and are configured to pick up and hold electronic components through suction by a negative pressure and release the electronic components they hold when a positive pressure is slightly supplied thereto. Head section 22 incorporates multiple electromagnetic motors (not shown) as drive sources for raising and lowering suction nozzles 41 in the Z-axis direction and causing corresponding suction nozzles 41 to rotate around their own axes to thereby change vertical positions of electronic components they hold and postures of electronic components they hold. Additionally, head section 22 includes second slave 69 (refer to FIG. 3) which connects to an industrial network, which will be described later. Elements such as various types of sensors are connected to second slave 69, which processes signals inputted into and outputted from the elements. Further, part camera 47 is provided on head section 22 so as to image an electronic component which is picked up to be held by suction nozzle 41 from respective supply positions of supply devices 15, 16. Imaged data imaged by part camera 47 is image processed at image processing section 65 (refer to FIG. 3). Image processing section 65 acquires an error in holding position of the electronic component held by suction nozzle 41 by image processing the imaged data of the electronic component.

Head section 22 is caused to move to an arbitrary position over device main body section 20 by moving device 23. To describe this specifically, moving device 23 includes an X-axis slide mechanism 50, configured to slide head section 22 in the X-axis direction, and a Y-axis slide mechanism 52, configured to move head section 22 in the Y-axis direction. X-axis slide mechanism 50 has X-axis slider 54, which is provided on device main body section 20 in such a manner as to move in the X-axis direction, and a linear motor (not shown) as a drive source. X-axis slider 54 is driven to move to an arbitrary position in the X-axis direction by the linear motor when it is driven accordingly.

Y-axis slide mechanism 52 has Y-axis slider 58 provided on a side surface of X-axis slider 54 in such a manner as to move in the Y-axis direction. Y-axis slider 58 is driven to move to an arbitrary position in the Y-axis direction by a linear motor (not shown) when it is driven accordingly. Then, head section 22 is attached to Y-axis slider 58 and moves to an arbitrary position over device main body section 20 as it is driven by moving device 23 accordingly. Additionally, head section 22 is attached to Y-axis slider 58 via connector 48 in such a manner as to be attached to and detached from Y-axis slider 58 through a one-touch action, whereby head section 22 can be exchanged for a different type of head section, for example, a dispenser head or the like. Consequently, in the present embodiment, head section 22 can be detachably attached to device main body section 20. Y-axis slide mechanism 52 includes first slave 67 (refer to FIG. 3), which is connected to an industrial network.

Mark camera 49 (refer to FIG. 3) is fixed t head section 22 in such a manner as to be directed downwards so as to image circuit board 100. Mark camera 49 can image an arbitrary position of circuit board 100 from above as head section 22 moves accordingly. Imaged data imaged by mark camera 49 is image processed by image processing section 65 (refer to FIG. 3). Image processing section 65 acquires information on circuit board 100, an error in mounting position, and the like through image processing the imaged data.

Figure 3:
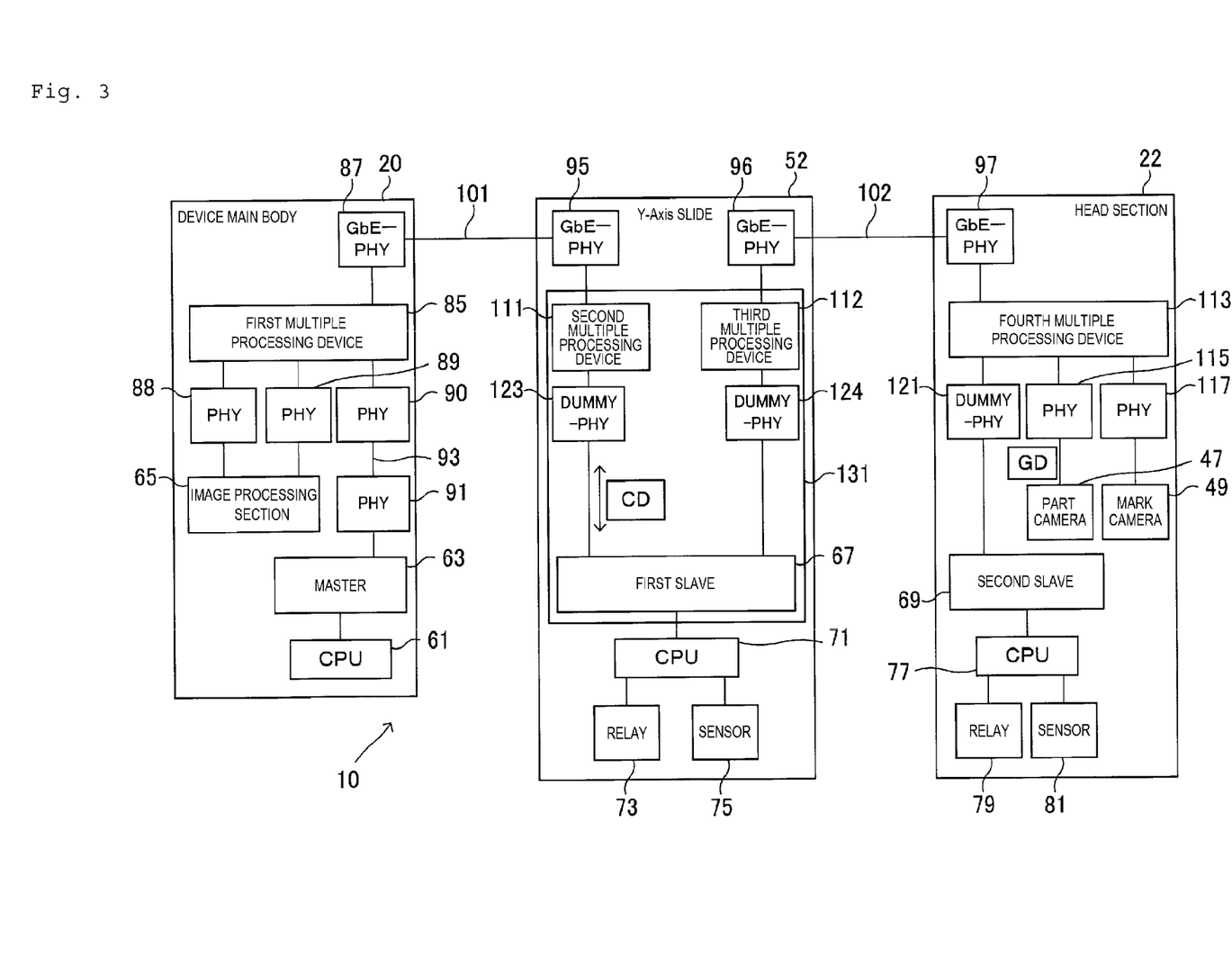
FIG. 3 is a block diagram of a multiplex communication system.

FIG. 3 is a block diagram showing the configuration of a multiplex communication system applied to mounting device 10. As show in FIG. 3, in mounting device 10, data is transmitted between CPU 61 and image processing section 65, which are incorporated in device main body section 20 provided fixedly at a location where mounting device 10 is placed, and devices which movable sections (Y-axis slide mechanism 52 and head section 22), which are designed to move relatively to device main body section 20, include by use of a multiplex communication system. In addition, devices of X-axis slide mechanism 50 are connected to device main body section 20 without involvement of multiplex communication. The configuration of the multiplex communication system shown in FIG. 3 is an example and hence can be modified as required. For example, an encoder signal of a linear scale attached to the linear motor of Y-axis slide mechanism 52 may be transmitted by use of the multiplex communication system. Further, an encoder signal of an encoder attached to the electromagnetic motor of head section 22 may be transmitted by use of the multiplex communication system.

(Configuration of Industrial Network)

Device main body section 20 has CPU 61, master 63, image processing section 65, and the like. First slave 67 is provided in Y-axis slide mechanism 52 in such a manner as to correspond to master 63 in device main body section 20. Second slave 69 is provided in head section 22 in such a manner as to correspond to master 63. Master 63 controls, in a supervisory fashion, the transmission of control data CD for controlling first slave 67 and second slave 69 which are connected to an industrial network (for example, MECHATROLINK (a registered trademark)-III). Master 63, first slave 67, and second slave 69 are IP cores used in configuring a logic circuit such as, for example, a programmable logic device (PLD), a field programmable gate array (FPGA), and a complex programmable logic device (CPLD). The application of master 63, first slave 67, and second slave 69 is not limited to such a logic circuit but may be applied to an application-specific integrated circuit (ASIC) specified for communication control or a combination of ASIC and a logic circuit.

Receiving control data CD collected by master 63 as an input thereinto, CPU 61 determines subsequent control contents (a type, a mounting position, and the like of an electronic component to be mounted). In addition, CPU 61 outputs control data CD corresponding to the determined control contents to master 63. Master 63 transmits control data CD inputted thereinto from CPU 61 to first slave 67 and second slave 69 by way of the industrial network.

Y-axis slide mechanism 52 has CPU 71 and the like in addition to first slave 67 described above. CPU 71 processes signals inputted into or outputted from various types of elements (relay 73, sensor 75, and the like) attached to Y-axis slide mechanism 52. Relay 73 is, for example, a limit switch configured to output a drive signal for driving a brake of the linear motor of Y-axis slide mechanism 52. Relay 73 restrains, for example, Y-axis slider 58 from overrunning by outputting a drive signal to drive the brake. Sensor 75 is, for example, a board height sensor for measuring a height of an upper surface of circuit board 100 based on a reference height position set in mounting device 10. First slave 67 outputs control data CD received from master 63 of device main body section 20 to CPU 71. CPU 71 controls relay 73 and the like based on control data CD inputted thereinto.

CPU 71 processes an output signal of sensor 75 or the like and outputs what results from the processing as control data CD to first slave 67. First slave 67 transmits control data CD inputted thereinto from CPU 71 towards master 63.

Head section 22 has CPU 77 and the like in addition to part camera 47, mark camera 49, and second slave 69, which are described above. CPU 77 processes signals inputted into and outputted from various elements (relay 79, sensor 81, and the like) provided in head section 22. Second slave 69 outputs control data CD received from master 63 of device main body section 20 to CPU 77. In addition, second slave 69 transmits an output signal from sensor 81 or the like which is processed by CPU 77 towards master 63 as control data CD.

(Configuration of Multiplex Communication System)

Next, a multiplex communication system will be described which is configured to transmit control data CD of the industrial network described above and imaged data GD imaged by part camera 47 or the like. Mounting device 10 transmits data among device main body section 20, Y-axis slide mechanism 52, and head section 22 via multiplex communication. As shown in FIG. 3, device main body section 20 has first multiprocessing device 85 and GbE-PHY 87, in addition to CPU 61 and the like, which are described above. GbE-PHY 87 is, for example, IC functioning as an interface between a logical layer and a physical layer. GbE-PHY 87 is connected with GbE-PHY 95 which Y-axis slide mechanism 52 has via LAN cable 101. Similarly, GbE-PHY 96 which Y-axis slide mechanism 52 has is connected with GbE-PHY 97 which head section 22 has via LAN cable 102. LAN cables 101, 102 are, for example, a LAN cable conforming to the communication standard of Gigabit Ethernet (a registered trademark).

First multiprocessing device 85 of device main body section 20 transmits and receives multiplexed data through LAN cables 101, 102 among second multiprocessing device 111 of Y-axis slide mechanism 52, third multiprocessing device 112 of Y-axis slide mechanism 52, and fourth multiprocessing device 113 of head section 22. First to fourth multiprocessing devices 85, 111, 112 113 multiplex control data CD of the industrial network, image data GD imaged by part camera 47, and the like through, for example, a time division multiplexing (TDM) system and transmit them. First multiprocessing device 85 and the like are made up, for example, of a logic circuit such as a field programmable gate array (FPGA) or the like.

Part camera 47 of head section 22 outputs imaged data GD to fourth multiprocessing device 113 by way of PHY 115 by, for example, an image transmission standard such as GigE-vision (a registered trade mark) or the like. For example, upon receiving a trigger signal from image processing section 65 of device main body section 20 via multiplex communication, part camera 47 performs imaging and outputs image data GD so imaged to fourth multiprocessing device 113. Similarly, mark camera 49 outputs image data GD imaged thereby to fourth multiprocessing device 113 via PHY 117. Fourth multiprocessing device 113 is connected with second slave 69 via DUMMY-PHY 121, which will be described later, and inputs and outputs control data CD into and from second slave 69. Fourth multiprocessing device 113 multiplexes various types of data such as image data GD, control data CD, and the like and transmits them to first multiprocessing device 85 (device main body section 20) through LAN cables 101, 102.

First multiprocessing device 85 is connected with image processing section 65 by way of PHY 88, 89 of device main body section 20. PHY 88 is an interface corresponding to part camera 47 of head section 22. PHY 89 is an interface corresponding to mark camera 49 of head section 22. First multiprocessing device 85 demultiplexes, for example, multiplexed data received from fourth multiprocessing device 113 via multiplex communication and separates image data GD imaged by part camera 47, First multiprocessing device 85 outputs image data GD so separated to image processing section 65 via PHY 88 in a data format conforming to GigE-vision (a registered trademark) standard. Similarly, first multiprocessing device 85 outputs image data GD of mark camera 49 separated from the multiplexed data to image processing section 65 via PHY 89.

Additionally, first multiprocessing device 85 is connected with master 63 via two PHYs 90, 91 of device main body section 20. PHY 90 is connected to first multiprocessing device 85. PHY 91 is connected to masters 63. PHYs 90, 91 are connected to each other via, for example, LAN cable 93. GbE-PHY 95 of Y-axis slide mechanism 52 is connected to GbE-PHY 96 via second multiprocessing device 111, DUMMY-PHY 123, which will be described later, first slave 67, DUMMY-PHY 124, and third multiprocessing device 112. Thus, in the present embodiment, second multiprocessing device 111 is connected with third multiprocessing device 112 via first slave 67.

Master 63 of device main body section 20 constructs an industrial network for transmitting and receiving control data CD for controlling the devices such as relay 73 and the like and realizes the integration (reduction) of wiring. More specifically, in the industrial network of the present embodiment, control data CD transmitted from master 63 is transmitted, for example, in such a manner as to circulate through first slave 67 and second slave 69 individually. For example, first slave 67 executes a read or write processing on control data CD received from master 63, and transfers control data CD so processed to second slave 69 of head section 22, First slave 67 copies data from a reading data position for first slave 67, which is set in control data CD in advance, and drives relay 73 in accordance with the contents of the data so copied. In addition, first slave 67 writes information denoting the completion of driving of relay 73 or detection information of sensor 75 in a writing data position for first slave 67 which is set in control data CD in advance and transfers control data CD to head section 22. In this way, first slave 67 and second slave 69 exchange control data CD at high speeds for transmission while performing the reading or writing processing on control data CD.

(DUMMY-PHY)

DUMMY-PHYs 121, 123, 124 shown in FIG. 3 pseudo-generate a signal conforming, for example, to the communication standard of Media Independent Interface (MII) and transmit the generated signal to first slave 67 or second slave 69 to thereby establish a communication. When referred to herein, "pseudo-generate" means, for example, generating a signal in a data format specified by the MII communication standard by logic circuits of DUMMY-PHYs 121, 123, 124, which are each constructed by FPGA. DUMMY-PHYs 121, 123, 124 have the same configuration. As a result, in the following description, DUMMY-PHY 124 provided between first slave 67 and third multiprocessing device 112 will mainly be described, and a description of other DUMMY-PHYs 121, 123 will be omitted as required.

DUMMY-PHY 124 is made up, for example, of a logic circuit such as a field programmable gate array (FPGA). In Y-axis slide mechanism 52 of the present embodiment, second multiprocessing device 111, third multiprocessing device 112, first slave 67, and DUMMY-PHYs 123, 124 are configured as a logic circuit in the same FPGA 131.

Figure 4:
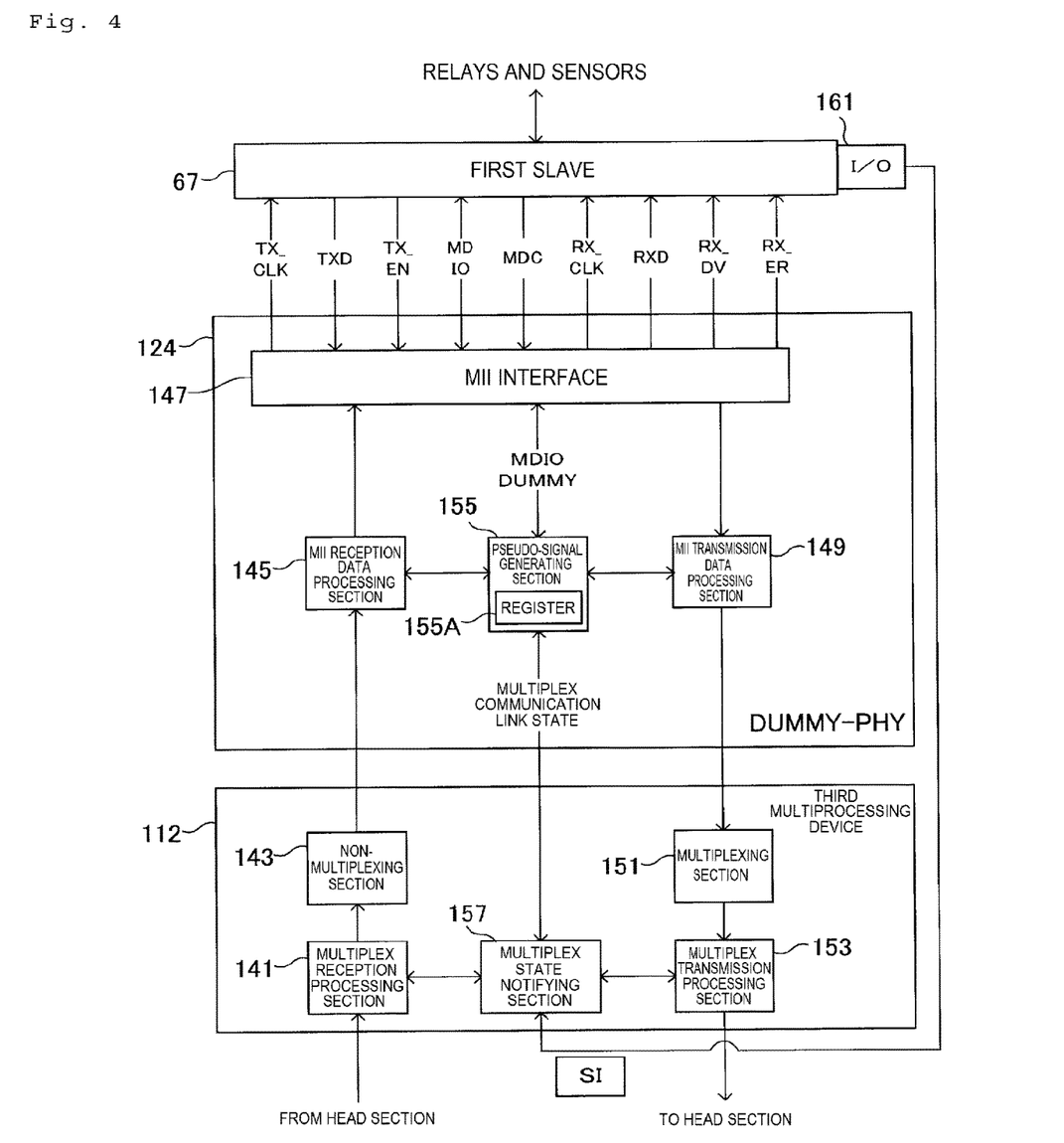
FIG. 4 is a block diagram showing schematic configurations of a third multiprocessing device and DUMMY-PHY.

FIG. 4 shows schematic configurations of DUMMY-PHY 124 and third multiprocessing device 112. Third multiprocessing device 112 receives multiplexed data, for example, from fourth multiprocessing device 113 of head section 22 at multiplex reception processing section 141. Multiplex reception processing section 141 outputs the received multiplexed data to demultiplexing section 143. Demultiplexing section 143 demultiplexes the multiplexed data so received, Demultiplexing section 143 outputs data on first slave 67 in the data separated through demultiplexing processing to Mil reception data processing section 145 of DUMMY-PHY 124. This data is, for example, control data CD received from second slave 69 of head section 22. In addition, demultiplexing section 143 outputs data transmitted from head section 22 towards device main body section 20 in the data separated through demultiplexing processing towards second multiprocessing device 111. Second multiprocessing device 111 multiplexes the data inputted from demultiplexing section 143 of third multiprocessing device 112 and the data inputted from first slave 67 and transmits them to first multiprocessing device 85.

MII interface 147 of DUMMY-PHY 124 is an interface connected with first slave 67 and executes a communication conforming to the MII standard. MII reception data processing section 145 outputs the data inputted from demultiplexing section 143 to first slave 67 by way of MII interface 147. First slave 67 executes a reading processing on control data CD received from second slave 69 and outputs control data CD so processed to master 63 of device main body section 20 by way of DUMMY-PHY 123 and second multiprocessing device 111.

Additionally, MII transmission data processing section 149 of DUMMY-PHY 124 inputs data from first slave 67 via MII interface 147. This data is, for example, such that first slave 67 executes a writing processing or the like on control data CD that second multiprocessing device 111 receives from master 63. MII transmission data processing section 149 outputs the data inputted from first slave 67 to multiplexing section 151 of third multiprocessing device 112. Multiplexing section 151 multiplexes the data inputted from MII transmission data processing section 149 together with other data to thereby generate multiplexed data. When referred to herein, other data means data transmitted from device main body section 20 towards head section 22 or data transmitted from Y-axis slide mechanism 52 towards head section 22 in the data that second multiprocessing device 111 receives from first multiprocessing device 85. Multiplexing section 151 outputs the multiplexed data that it generates to multiplex transmission processing section 153. Multiplex transmission processing section 153 transmits the multiplexed data inputted from multiplexing section 151 to fourth multiprocessing device 113 of head section 22 via LAN cable 102. As a result, control data CD transmitted from master 63 to first slave 67 is transmitted to second slave 69.

MII interface 147 transmits and receives a TXD signal (transmission data) and an RXD signal (reception data) shown in FIG. 4 to and from first slave 67 and itself. In addition to the TXD signal and the RXD signal, MII interface 147 transmits and receives various types of control signals to and from first slave 67. For example, MII interface 147 transmits a transmission clock signal such as a TX_CLK signal, a media dependent input/output (MDIO) signal for management control, which will be described later, an MDC signal, which is a clock signal therefor, and the like.

Here, in the case that DUMMY-PHY 124 of the present embodiment is not used, there is a possibility that first slave 67 has to be connected with third multiprocessing device 112 via two PHYs and a cable connecting the two PHYs. Specifically speaking, the two PHYs exchange digital signals and analog signals to transmit data on a cable. A cable for connecting the two PHYs is, for example, a LAN cable conforming to the Ethernet (a registered trademark) standard, Conventionally, in the case that first slave 67 is connected with an external device such as third multiprocessing device 112 using an IP core for use in the industrial network as first slave 67, first slave 67 needs to be connected with third multiprocessing device 112 via the two PHYs and the LAN cable. Then, among slave IP cores used in the industrial network, there is an IP core set so as to start communicating with an external device, that is, third multiprocessing device 112 only after a communication is established between the two PHYs to which the LAN cable is connected.

For example, registers are provided on the two PHYs to indicate whether a communication has been established between the two PHYs. Then, first slave 67 transmits an MDIO signal to the PHY to acquire information set in the register of the PHY. In the case that a register value so acquired is a value indicating that a communication has been established between the PHYs, first slave 67 starts communicating with third multiprocessing device 112 via the two PHYs and the LAN cable. On the other hand, first slave 67 is kept waiting for a start of communication with third multiprocessing device 112 until first slave 67 can acquire a register value indicating that a communication is established. Then, pseudo signal generating section 155 of DUMMY-PHY 124 of the present embodiment shown in FIG. 4 transmits an MDIO signal to first slave 67 via MII interface 147 to thereby establish a communication with first slave 67 when starting a multiplex communication.

Figure 5:
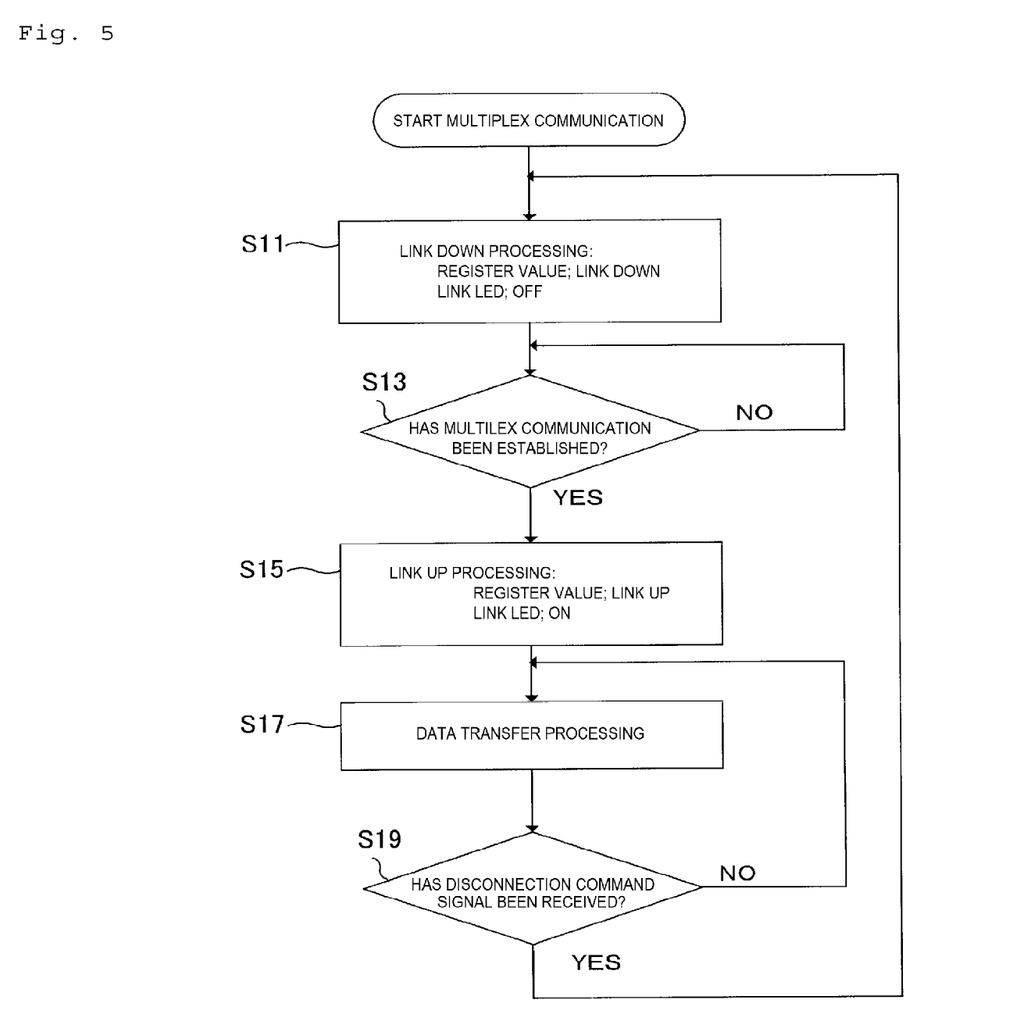
FIG. 5 is a flowchart for explaining operations of DUMMY-PHY.

FIG. 5 shows a processing procedure of DUMMY-PHY 124. Firstly, when power is supplied to a device main body, mounting device 10 carries out a configuration in order to construct a logic circuit such as second multiprocessing device 111 of FPGA 131. When the circuit is completely constructed, in step (hereinafter, referred to simply as "S") 11 in FIG. 5, pseudo signal generating section 155 sets a register value. As shown in FIG. 4, pseudo signal generating section 155 includes register 155A for storing information indicating that a communication is established or a communication is disconnected. With a multiplex communication on LAN cable 102 not having been established by third multiprocessing device 112, pseudo signal generating section 155 sets a value indicating a link down in register 155A. In this state, even though DUMMY-PHY 124 has an enquiry through an MDI© signal from first slave 67, DUMMY-PHY 124 responds with the register value indicating the link down.

Pseudo signal generating section 155 may execute a processing of notifying of a communication state in S11. For example, pseudo signal generating section 155 causes a link LED provided on a circuit board of FPGA 131 to indicate a link state to be turned off in a link down (no multiplex communication line is established) state. This enables to notify a user or the like of occurrence the link down.

MII reception data processing section 145 and MII transmission data processing section 149 can control the start or stop of data transfer based on the control of pseudo signal generating section 155. In such a state that no multiplex communication is established, pseudo signal generating section 155 stops MII reception data processing section 145 and MiI transmission data processing section 149 from performing a transfer operation. When various enquiries are made by first slave 67 in such a state that no multiplex communication is established, pseudo signal generating section 155 may execute a processing of responding to the enquiries so made. For example, when pseudo signal generating section 155 receives an enquiry on a data transfer speed from first slave 67, responding to the enquiry, pseudo signal generating section 155 may execute a so-called auto negotiation in which an appropriate communication speed is set, or the like.

As shown in FIG. 4, third multiprocessing device 112 has multiplex state notifying section 157. Multiplex state notifying section 157 monitors the state of multiplex communication. For example, multiplex state notifying section 157 monitors the states of multiplex reception processing section 141 and multiplex transmission processing section 153 to thereby determine whether a multiplex communication on LAN cable 102 is established. Additionally, as with multiplex state notifying section 157 of third multiprocessing device 112, a multiplex state notifying section (not shown) of second multiprocessing device 111 monitors the state of a multiplex reception processing section and a multiplex transmission processing section of second multiprocessing device 111 to thereby determine whether a multiplex communication on LAN cable 101 is established. Determining that the multiplex communication on LAN cable 101 is established, the multiplex state notifying section of second multiprocessing device 111 notifies multiplex state notifying section 157 of third multiprocessing device 112 to that effect. Then, multiplex state notifying section 157 of third multiprocessing device 112 determines whether two multiplex communications on LAN cables 101, 102 are established based on a notification from second multiprocessing device 111 and the states of multiplex reception processing section 141 of third multiprocessing device 112 and the like. Determining that the two multiplex communications are established on LAN cables 101, 102, multiplex state notifying section 157 of third multiprocessing device 112 notifies pseudo signal generating section 155 of DUMMY-PHY 124 of data notifying the multiplex communications being established.

As shown in FIG. 5, after having executed S11, pseudo signal generating section 155 executes S13. In S13, pseudo signal generating section 155 determines whether the multiplex communications are established based on data from multiplex state notifying section 157. Pseudo signal generating section 155 maintains the link down state until it receives data indicating that the multiplex communications are established from multiplex state notifying section 157 (S13: NO). On the other hand, when receiving data indicating that the multiplex communications are established from multiplex state notifying section 157 (S13: YES), pseudo signal generating section 155 sets a value indicating a link up in register 155A (S15). As a result, receiving an enquiry in the form of an MDIO signal from first slave 67, pseudo signal generating section 155 responds thereto with a register value indicating a link up. In S15, pseudo signal generating section 155 may illuminate the link LED indicating a link state on a circuit board to notify of the link up.

Next, in S17, pseudo signal generating section 155 causes MII reception data processing section 145 and MiI transmission data processing section 149 to start a data transfer processing. On the other hand, when acquiring a register value indicating the link up, that is, the establishment of multiplex communications from pseudo signal generating section 155, first slave 67 starts a communication with third multiprocessing device 112 via DUMMY-PHY 124. MII transmission data processing section 149 transfers the data received from first slave 67 to multiplexing section 151. In addition, MII reception data processing section 145 transfers the data received from demultiplexing section 143 to first slave 67. In this manner, DUMMY-PHY 124 can properly carry out a delivery of data between third multiprocessing device 112 and first slave 67. As a result, as shown in FIG. 3, third multiprocessing device 112 and first slave 67 can be connected together by DUMMY-PHY 124, thereby obviating the necessity of the two PHYs and the LAN cable connecting the two PHYs together. Then, in the present embodiment, mounting device 10 executes the mounting work while transmitting control data CD or the like by the multiplex communication system shown in FIG. 3.

(Disconnection of Multiplex Communication Line)

Here, for example, in mounting device 10 of the present embodiment, head sections 22 can be exchanged while power is kept supplied to device main body section 20. As described above, head section 22 is attached to Y-axis slider 58 via connector 48 (refer to FIG. 2) in such a manner as to be detachably attached thereto through one-touch action. In exchanging work of head sections 22, the multiplex communication line of LAN cable 102 is disconnected. For example, a communication between third multiprocessing device 112 and fourth multiprocessing device 113 is disconnected by removing head section 22 from connector 48, whereby the multiplex communication line of LAN cable 102 is disconnected. Additionally, for example, when the power supply to head section 22 is cut off as head sections 22 are exchanged, the multiplex communication line of LAN cable 102 is disconnected.

In the event that the multiplex communication line of LAN cable 102 is disconnected while power is kept supplied to device main body section 20, there is a possibility that multiplex state notifying section 157 of third multiprocessing device 112 takes a certain length of processing time before multiplex state notifying section 157 detects a disconnection of the multiplex communication line. Specifically speaking, for example, multiplex state notifying section 157 monitors the states of multiplex reception processing section 141 and multiplex transmission processing section 153 and measures a continuous time over which multiplexed data cannot be received on LAN cable 102. Then, when a state in which the multiplexed data cannot be received continues for a certain length of time, multiplex state notifying section 157 causes multiplex transmission processing section 153 to transmit confirmation data towards fourth multiprocessing device 113 it faces. Then, in the event that multiplex state notifying section 157 cannot receive a response to the confirmation data from fourth multiprocessing device 113 even when only a further certain length of time elapses, multiplex state notifying section 157 detects that the multiplex communication line on LAN cable 102 is disconnected. In this case, multiplex state notifying section 157 needs a certain length of processing time before it detects the disconnection of the multiplex communication line. In the event that the detection of disconnection of the multiplex communication line is delayed, an issuance of a disconnecting command from multiplex state notifying section 157 to pseudo signal generating section 155 of DUMMY-PHY 124 is delayed. Pseudo signal generating section 155 continues the transfer processing by MIl reception data processing section 145 and MII transmission data processing section 149, that is, the transfer of control data CD between third multiprocessing device 112 and first slave 67 until it receives the command of disconnection from multiplex state notifying section 157.

Third multiprocessing device 112 keeps transmitting control data CD received by way of the multiplex communication line to first slave 67 via DUMMY-PHY 124 until a disconnection of multiplex communication line of LAN cable 102 is detected. On the other hand, there is a possibility that a data error is generated in control data CD due to the disconnection of the multiplex communication line. For example, a data error is generated in control data CD due to noise in association with the exchange work of head sections 22. As a result, there is a possibility that control data CD in which the data error is generated is transmitted from third multiprocessing device 112 to first slave 67 and then to master 63, Then, the master 63 receives control data in which the data error is generated and executes a processing based on control data in question, resulting in a possibility that the processing becomes unstable. For example, there is a possibility that master 63 issues an erroneous control command to first slave 67 or the like.

Then, in the present embodiment, CPU 61 of device main body section 20 causes master 63 to transmit control data CD to first slave 67 before the multiplex communication line of LAN cable 102 is disconnected. First slave 67 disconnects a communication between third multiprocessing device 112 and first slave 67 based on control data CD received from master 63. As a result, a transmission of control data CD in which the data error is generated is restrained.

Figure 6:
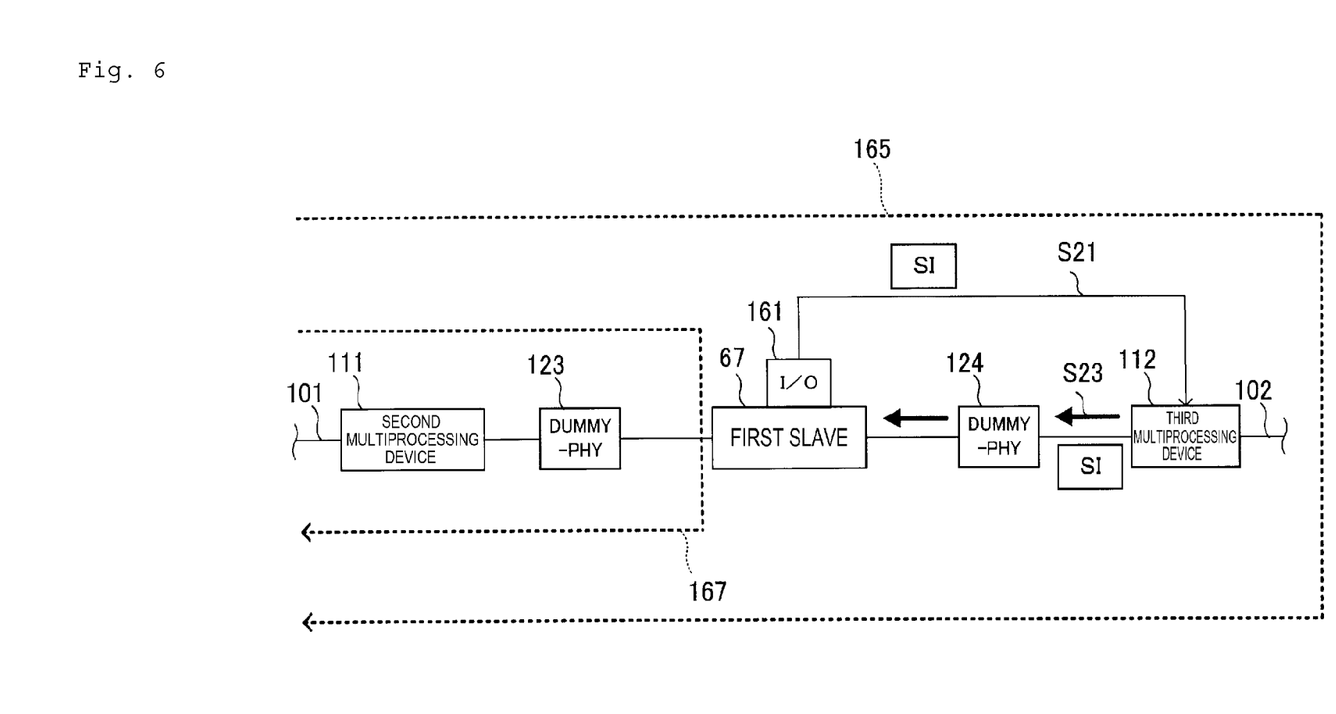
FIG. 6 is a diagram showing a state resulting when a multiplex communication line is disconnected.

FIG. 6 shows a state resulting when the multiplex communication line is disconnected. For example, the user operates the touch panel of display device 13 (refer to FIG. 1) and inputs a start of exchange work of head sections 22. When accepting the input operated via display device 13, CPU 61 of device main body section 20 notifies master 63 of the transmission of control data CD (an example of a notifying step). The data whose transmission is notified to master 63 and control data CD transmitted from master 63 are data (an example of a disconnection command) commanding a disconnection of a communication between third multiprocessing device 112 and first slave 67. As a result, master 63 transmits control data CD indicating a disconnection of a communication to first slave 67 via the industrial network based on the control of CPU 61 before the disconnection of the multiplex communication line of LAN cable 102 is started. The condition for transmitting control data CD commanding a disconnection of a communication is not limited to the input operated by the user as described above. For example, CPU 61 may command master 63 to transmit control data CD when displaying an exchange of head sections 22 in association with a change in the board type of circuit board 100 to be produced on display device 13. Alternatively, for example, when the multiplex communication line of LAN cable 102 needs to be disconnected in association with a generation of an error, CPU 61 may command master 63 to transmit control data CD.

When receiving control data CD indicating a disconnection of a communication between third multiprocessing device 112 and first slave 67, first slave 67 transmits a disconnection command signal SI to DUMMY-PHY 124 by way of third multiprocessing device 112. This disconnection command signal SI is a signal commanding a disconnection of a communication between first slave 67 and DUMMY-PHY 124, that is, a signal commanding a disconnection of a communication between first slave 67 and third multiprocessing device 112.

As shown in FIGS. 4 and 6, in the present embodiment, first slave 67 has a parallel I/O interface (IF) 161 for transmitting disconnection command signal SI. First slave 67 is connected to multiplex state notifying section 157 of third multiprocessing device 112 via parallel I/O IF 161. First slave 67 transmits disconnection command signal SI to third multiprocessing device 112 through a parallel communication by way of parallel I/O IF 161 (S21 in FIG. 6). First slave 67 notifies third multiprocessing device 112 of disconnection command signal SI by use of one bit or multiple bits of parallel I/O IF 161. The method for notifying of disconnection command signal SI is not limited to parallel I/O IF 161. For example, first slave 67 may include a communication interface of a universal asynchronous receiver transmitter (UART) as an interface for transmitting disconnection command signal SI. Then, first slave 67 may notify third multiprocessing device 112 of dislocation command signal SI by a serial communication via the UART IF.

Multiplex state notifying section 157 of third multiprocessing device 112 transmits disconnection command signal SI to pseudo signal generating section 155 when it receives disconnection command signal SI from first slave 67 (S23 in FIG. 6). Disconnection command signal SI transmitted from first slave 67 to multiplex state notifying section 157 of third multiprocessing device 112 in S21 and disconnection command signal SI transmitted from multiplex state notifying section 157 to pseudo signal generating section 155 in S23 may be the same data or data of the same contents and different formats.

(Disconnection Command Signal SI Transmission Timing)

Figure 7:
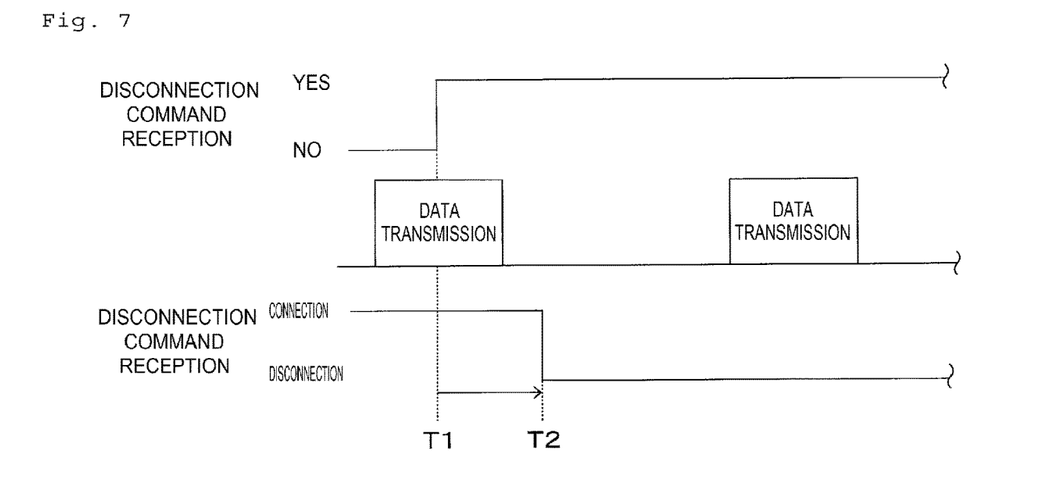
FIG. 7 is a diagram illustrating a timing at which a disconnection command signal is transmitted.

Here, in the present embodiment, in step S23 in FIG. 6, multiplex state notifying section 157 transmits disconnection command signal SI to pseudo signal generating section 155 at such a timing that it does not receive control data CD from fourth multiprocessing device 113 of head section 22. FIG. 7 is a diagram illustrating a timing at which disconnection command signal SI is transmitted from multiplex state notifying section 157. When written in FIG. 7, "Disconnection Command Reception" denotes a timing at which disconnection command signal SI transmitted from first slave 67 is received by pseudo signal generating section 155 in S21. When written in FIG. 7, "Disconnection Command Transmission" denotes a timing at which disconnection command signal SI is transmitted from pseudo signal generating section 155 to multiplex state notifying section 157 in S23. When written in FIG. 7, "Data Communication" denotes a timing at which control data CD is being transmitted from second slave 69 of head section 22 to first slave 67 of Y-axis slide mechanism 52 via LAN cable 102.

For example, multiplex state notifying section 157 of third multiprocessing device 112 receives disconnection command signal SI from first slave 67 at time T1 shown in FIG. 7. At time T1, a data communication is performed in which control data CD is transmitted from second slave 69 to first slave 67. As a result, multiplex state notifying section 157 waits until time T2 before which the data communication of control data CD is completed. Multiplex state notifying section 157 transmits disconnection command signal SI to pseudo signal generating section 155 at time T2.

The determination method for determining whether the data communication of control data CD is being carried out is not particularly limited. For example, when multiplexed data is being received at multiplex reception processing section 141, multiplex state notifying section 157 may determine that the data communication of control data CD is being carried out. Alternatively, when effective data is set in control data CD separated from multiplexed data by demultiplexing section 143, multiplex state notifying section 157 may determine that the data communication of control data CD is being carried out. For example, when an interval during which multiplexed data of a multiplex communication line is transmitted is shorter than an interval during which control data CD is transmitted from second slave 69 to first slave 67, a state in which control data CD is set and a state in which control data CD is not set are generated in the multiplexed data. When referred to herein, the state in which control data CD is not set is a state in which although a bit where control data CD is set is secured in the multiplexed data, no effective data is set in the bit so secured. Effective data is, for example, data which is to be transmitted from second slave 69 to first slave 67. Then, multiplex state notifying section 157 may determine that the data communication of control data CD is being carried out when the data transmitted from second slave 69 is set in control data CD which is separated from the multiplexed data.

Additionally, multiplex state notifying section 157 may determine whether the data communication of control data CD is being carried out based on a time interval during which effective data is included in control data CD which is separated from the multiplexed data by demultiplexing section 143, that is, a time interval during which control data CD is received from second slave 69. For example, when an industrial Ethernet (a registered trademark) such as MECHATROLINK (a registered trademark)-III is used as an industrial network, this time interval is a transmission interval of a packet defined by a communication standard of a base Ethernet (a registered trademark) or a communication standard of an industrial Ethernet (a registered trademark). Multiplex state notifying section 157 may determine a timing at which the data communication of control data CD is not carried out, that is, a timing at which the "data communication" shown in FIG. 7 is not generated based on the time interval and transmit disconnection command signal SI to pseudo signal generating section 155 at that timing. Multiplex state notifying section 157 may determine whether the data communication of control data CD is carried out by determining the contents of control data CD. For example, when control data CD is received by being divided into multiple pieces of data, multiplex state notifying section 157 may determine that the data communication of control data CD continues to be carried out until it detects data indicating an end of control data CD (an end flag or the like). Alternatively, when a value of a data length of transmission data is set in control data CD, multiplex state notifying section 157 may determine whether the data communication of control data CD is carried out based on the data length.

Consequently, in the present embodiment, multiplex state notifying section 157 determines whether control data CD is transmitted through the multiplex communication line of LAN cable 102 after it acquires disconnection command signal SI from first slave 67 and notifies pseudo signal generating section 155 of disconnection command signal SI upon determining that control data CD is not transmitted through the multiplex communication line.

When disconnecting a communication between first slave 67 and DUMMY-PHY 124, the multiplex communication line of LAN cable 102 is kept connected. Consequently, there is a possibility that first slave 67 transmits control data CD to second slave 69 by way of third multiprocessing device 112. Due to this, there is a possibility that a disconnection of a communication between first slave 67 and third multiprocessing device 112 affects a normal transmission of control data CD, causing a data error or the like to be generated in control data CD. Then, multiplex state notifying section 157 notifies pseudo signal generating section 155 of disconnection command signal SI in association with a timing at which control data CD is not transmitted. As a result, as a communication between first slave 67 and third multiprocessing device 112 is disconnected, a data error or the like can be suppressed from being generated in control data CD.

Further, in the present embodiment, CPU 61 causes master 63 to transmit control data CD, commanding to disconnect a communication between third multiprocessing device 112 and first slave 67, to first slave 67 by way of LAN cable 101 (an example of a second multiplex communication line) before starting the multiplex communication line to be disconnected. First slave 67 transmits disconnection command signal SI to DUMMY-PHY 124 by way of third multiprocessing device 112 based on control data CD received from master 63. According to this configuration, a communication between first slave 67 and third multiprocessing device 112 can be disconnected in advance by control data CD of the industrial network. Incidentally, the method for commanding a disconnection of a communication between third multiprocessing device 112 and first slave 67 is not limited to control data CD. For example, CPU 61 may communicate with first slave 67 by use of LAN cable 101 or a communication line different from LAN cable 101 to issue a command to disconnect a communication.

Referring back to FIG. 5, a subsequent processing of pseudo signal generating section 155 will be described. Pseudo signal generating section 155 determines whether it receives disconnection command signal SI from multiplex state notifying section 157 (S19) after control data CD is started to be transmitted by way of the multiplex communication system in S17. Pseudo signal generating section 155 causes MII reception data processing section 145 and MII transmission data processing section 149 to continue their transfer processing until it receives disconnection command signal SI from multiplex state notifying section 157. That is, control data CD continues to be transmitted via the multiplex communication system until master 63 transmits disconnection command signal SI based on control data CD.

On the other hand, receiving disconnection command signal SI from multiplex state notifying section 157 (S19: YES), pseudo signal generating section 155 executes the processing from S11 again. In S 11, pseudo signal generating section 155 sets a register value indicating a link down in register 155A in order to disconnect the communication with first slave 67. Upon receiving an enquiry through an MDI© signal from first slave 67, DUMMY-PHY 124 responds thereto with the register value indicating a link down. For example, first slave 67 periodically executes a processing of acquiring the register value set in register 155A after activation. After establishing a communication with DUMMY-PHY 124, when acquiring the register value indicating a link down, first slave 67 disconnects a communication with DUMMY-PHY 124, that is, a communication with third multiprocessing device 112. As a result, the communication between first slave 67 and third multiprocessing device 112 is disconnected.

Transmission paths 165, 167 indicated by broken lines in FIG. 6 indicate a path along which control data CD is transmitted. Transmission path 165 indicates a case in which a communication between first slave 67 and third multiprocessing device 112 is established, that is, a case in which the multiplex communication line of LAN cable 102 is connected. In this case, for example, first slave 67 processes control data CD received from master 63 and transmits control data CD so processed towards second slave 69. For example, first slave 67 processes control data CD received from second slave 69 and transmits control data CD so processed towards master 63.

On the other hand, transmission path 167 indicates a case in which a communication between first slave 67 and third multiprocessing device 112 is disconnected, that is, a case in which the multiplex communication line of LAN cable 102 is connected. In this case, for example, first slave 67 acquires the register value of DUMMY-PHY 124 through an MDIO signal and disconnects a communication with third multiprocessing device 112, Then, first slave 67 stops transmitting control data CD to second slave 69. First slave 67 transmits control data CD received from master 63 in such a way as to return it to master 63. Starting the return transmission, first slave 67 notifies CPU 61 of device main body section 20 of, for example, the disconnection of the communication between third multiprocessing device 112 and first slave 67 by way of master 63. Upon receiving the notification from first slave 67, CPU 61 displays, for example, a message permitting a start of exchanging head sections 22 on display device 13. The user confirms the display of display device 13 and then starts exchange work of head sections 22. As a result, even in the event that the user starts exchanging head sections 22, causing a data error in control data CD transmitted through LAN cable 102 in association with disconnection of the multiplex communication line, control data CD in which the data error is generated is prevented from being inputted into first slave 67. As a result, the occurrence of a situation can be prevented in which master 63 receives control data CD in which the data error is generated, resulting in an unstable processing.

Incidentally, mounting device 10 is an example of a working machine. CPU 61 is an example of a control device. First slave 67 and second slave 69 are an example of a multistage slave. LAN cable 102 is an example of a multiplex communication line. LAN cable 101 is an example of a second multiplex communication line. Third multiprocessing device 112 is an example of a multiprocessing device. Second multiprocessing device 111 is an example of a second multiprocessing device. DUMMY-PHY 124 is an example of a pseudo-signal transmitting section. The multiplex communication system of mounting device 10 shown in FIG. 3 is an example of a multiplexing device. Disconnection command signal SI is an example of a disconnection command.

Thus, according to the embodiment that has been described heretofore, the following advantageous effects will be provided.

According to an aspect of the present embodiment, upon accepting an operated input via display device 13, CPU 61 of device main body section 20 notifies master 63 of the transmission of control data CD. Before starting a disconnection of the multiplex communication line of LAN cable 102, master 63 transmits to first slave 67 control data CD commanding first slave 63 to disconnect the communication. Upon receiving control data CD so transmitted, first slave 67 transmits disconnection command signal SI to DUMMY-PHY 124 via third multiprocessing device 112.

According to this configuration, DUMMY-PHY 124 disconnects the communication between first slave 67 and DUMMY-PHY 124 by acquiring disconnection command signal SI transmitted thereto. As a result, the communication between first slave 67 and DUMMY-PHY 124, in other words, between first slave 67 and third multiprocessing device 112 can be disconnected before the multiplex communication line of LAN cable 102 is disconnected. As a result, for example, even in the event that a data error is generated in control data CD due to the disconnection of the multiplex communication line, control data CD in which the data error is generated can be prevented from being transmitted from third multiprocessing device 112 to first slave 67.

Additionally, head section 22, on which second slave 69 is provided, can be detachably attached to device main body section 20. In the case that head section 22 is configured to be detachably attached to device main body section 20, head section 20 can be removed for exchange when changing types of head sections 22. In exchange work of head sections 22, a disconnection of the communication between first slave 67 and second slave 69, that is, a disconnection of the multiplex communication line occurs. Due to this, in mounting device 10 in which second slave 69 is provided on head section 22 which is detachable as described above, the proper disconnection of the communication between third multiprocessing device 112 and first slave 67 becomes extremely effective.

This patent application is not limited to the embodiment that has been described heretofore, and hence, needless to say, various improvements and modifications can be made without departing from the sprit and scope of the patent application.

For example, the communication standard applied to the industrial network is not limited to the Ethernet (a registered trademark), and hence, other communication standards may be adopted. The interface standard is not limited to Mil, and hence, the Gigabit Media Independent Interface (GMII) or the Reduced Media Independent Interface (RMII) may be adopted.

In the embodiment described above, second multiprocessing device 111, third multiprocessing device 112, first slave 67, and DUMMY-PHYs 123, 124 are incorporated in the same FPGA 131, but they may be mounted separately.

CPU 61 of device main body section 20 and first multiprocessing device 85 may be configured so as to be mounted on the same board.

Figure 8:
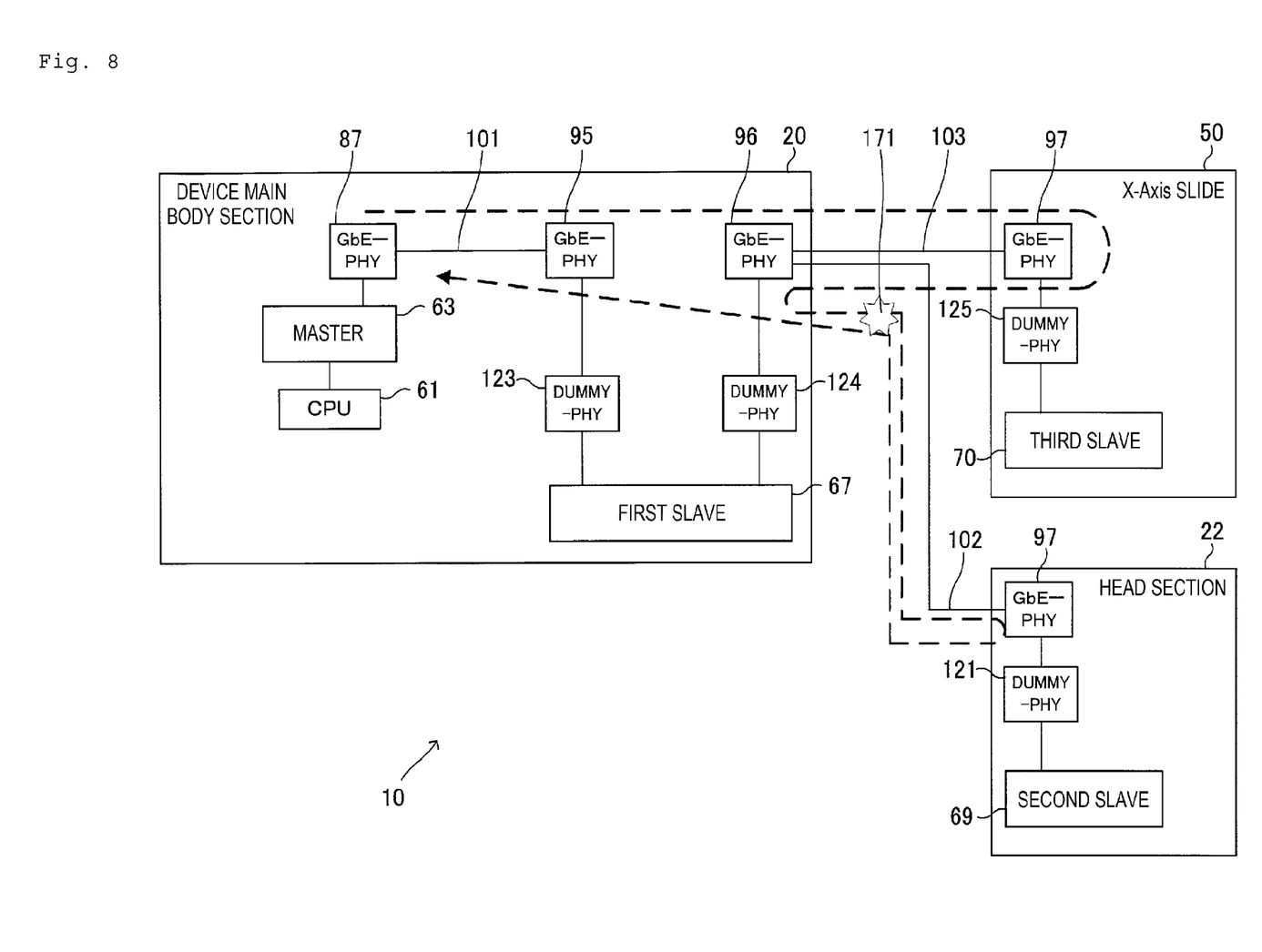
FIG. 8 is a block diagram of another example of a multiplex communication system.

In the embodiment described above, the two slaves are connected to one master 63, but this patent application is not limited thereto. The number of masters 63 may be two or more. The number of slaves may be a plural number of three or larger. FIG. 8 shows a block diagram of another example of a multiplex communication system. In order to avoid a risk of the figure getting complicated, in FIG. 8, some devices such as first multiprocessing device 85, second multiprocessing device 111, and the like shown in FIG. 3 are omitted from illustration. In the following description, like reference signs will be given to like configurations to those of the embodiment described above, so that a description thereof will be omitted as required.

In an example shown in FIG. 8, master 63 and first slave 67 are provided on device main body section 20 constituting a fixed side of component mounting device 10, Second slave 69 is provided on head section 22, First slave 67 and second slave 69 are connected to each other via LAN cable 102. Third slave 70 is provided on X-axis slide mechanism 50. Third slave 70 is connected to GbE-PHY 97 via DUMMY-PHY 125 and a multiprocessing device (not shown). First slave 67 is connected to GbE-PHY 97 via LAN cable 103. Then, as indicated by broken lines in FIG. 8, control data CD is transmitted so as to be circulated sequentially in the order of master 63, first slave 67, third slave 70, first slave 67, second slave 69, first slave 67, and master 63. Even in such a multistage slave of three or more stages, as in the embodiment described above, before starting disconnection of the multiplex communication lines such as LAN cable 102 and LAN cable 103, master 63 can transmit control data CD commanding a disconnection of the communication lines to first slave 67. That is, the same advantageous effect as the one obtained in the embodiment described above can be obtained.

In addition, in the embodiment described above, CPU 61 issues the command to disconnect the communication between first slave 67 and third multiprocessing device 112 in response to the operated input by the user, but this patent application is not limited thereto. For example, upon detecting a failure in the multiplex communication line, CPU 61 may issue a command to disconnect the communication between first slave 67 and third multiprocessing device 112. For example, CPU 61 detects a communication failure of the multiplex communication line along which control data CD is transmitted from first slave 67 to second slave 69 in position 171 shown in FIG. 8. The method for detecting a communication failure is not particularly limited. For example, a communication failure in the multiplex communication line may be detected based on the presence of a confirmation signal transmitted from an upstream-side multiprocessing device (third multiprocessing device 112 or the like) to a downstream-side multiprocessing device (fourth multiprocessing device 113 or the like).

Then, for example, upon receiving a notification notifying that a communication failure is detected from third multiprocessing device 112, CPU 61 may transmit control data CD commanding a disconnection of the communications to first slave 67 before the multiplex communication lines of LAN cable 102 and LAN cable 103 are started to be disconnected. As a result, even in the case of occurrence of a communication failure, control data CD in which the data error is generated can be prevented from being transmitted from third multiprocessing device 112 to first slave 67 by disconnecting in advance the communication between first slave 67 and third multiprocessing device 112.

Further, in the embodiment described above, electronic component mounting machine 10, which is configured to mount electronic components on circuit board 100, is described as being adopted as a working machine of this patent application. However, the working machine in this patent application is not limited to electronic component mounting device 10, and hence, another board work machine such as a solder printing machine or the like can also be adopted as the working machine of this patent application. Furthermore, the working machine may be, for example, a machine tool or a robot configured to perform assembling work.

REFERENCE SIGNS LIST

10 Electronic component mounting device (working machine), 20 Device main body section, 22 Head section (Movable section), 23 Moving device (movable section moving device), 50 X-axis slide mechanism (Movable section moving device), 52 Y-axis slide mechanism (Movable section moving device), 61 CPU (Control device), 63 Master, 67 First slave (Multistage slave), 69 Second slave (Multistage slave), 101 LAN cable (Second multiplex communication line), 102 LAN cable (Multiplex communication line), 111 Second multiprocessing device (Second multiprocessing device), 112 Third multiprocessing device (Multiprocessing device), 124 DUMMY-PHY (pseudo signal transmitting section), CD Control data, SI Disconnection command signal (Dislocation command).

The invention claimed is:

1. A multiplexing device, comprising:
a multistage slave configured to process data transmitted from a master in an industrial network;
a multiprocessing device configured to multiplex control data transmitted from a first slave of the multistage slave, the first slave being disposed at an upstream side to the master of the multistage slave, and transmit the multiplexed control data to a second slave of the multistage slave by way of a multiplex communication line, the second slave being disposed at a downstream side of the multistage slave; and
a control device configured to issue, to the first slave, a disconnection command to disconnect a communication between the first slave and the multiprocessing device, in response to a disconnection of the multiplex communication line.

2. The multiplexing device according to claim 1, wherein the multiplexing device further comprises a pseudo signal transmitter connected between the first slave and the multiprocessing device,
wherein the pseudo signal transmitter is configured to pseudo-generate a signal conforming to a communication standard of the industrial network, transmit the generated signal to the first slave so as to establish a communication with the first slave, and transmit the control data between the multiprocessing device and the first slave after the communication is established,
wherein the control device is further configured to notify the first slave of the disconnection command, and
wherein the first slave is configured to notify the pseudo signal transmitter of the disconnection command obtained from the control device via the multiprocessing device.

3. The multiplexing device according to claim 2,
wherein the multiprocessing device is further configured to determine whether the control data is transmitted through the multiplex communication line after acquiring the disconnection command from the first slave, and notify the pseudo signal transmitter of the disconnection command upon determining that the control data is not transmitted through the multiplex communication line.

4. The multiplexing device according to claim 2, wherein the multiplexing device further comprises a second multiprocessing device configured to multiplex the control data transmitted from the first slave, and then transmit the multiplexed control data to the master by way of a second multiplex communication line,
wherein the master is configured to transmit particular control data, commanding the disconnection of a communication between the multiprocessing device and the first slave, to the first slave, by way of the second multiplex communication line as the disconnection command, based on a control of the control device before a disconnection of the multiplex communication line is started, and
wherein the first slave is configured to notify the pseudo signal transmitter of the disconnection command by way of the multiprocessing device based on the particular control data transmitted from the master.

5. The multiplexing device according to claim 1, wherein the multistage slave comprises:
the first slave disposed at a side of the master upstream of the multistage slave; and
the second slave disposed at a downstream side of the multistage slave, and to which the control data is transmitted by way of the multiplex communication line.

6. The multiplexing device according to claim 1, wherein the control device is further configured to transmit the disconnection command in accordance with an occurrence of a communication failure on the multiplex communication line.

7. A mounting device configured to mount an electronic component by picking up and holding the electronic component using a head section, the mounting device comprising:
a multiplexing device including
a multistage slave configured to process data transmitted from a master in an industrial network;
a multiprocessing device configured to multiplex control data transmitted from a first slave of the multistage slave, the first slave being disposed at an upstream side to the master of the multistage slave, and transmit the multiplexed control data to a second slave of the multistage slave by way of a multiplex communication line, the second slave being disposed at a downstream side of the multistage slave; and
a control device configured to issue, to the first slave, a disconnection command to disconnect a communication between the first slave and the multiprocessing device, in response to a disconnection of the multiplex communication line,
wherein data relating to the electronic component is transmitted by the multiplexing device.

8. The mounting device according to claim 7, further comprising:
a device main body section on which the master is provided,
wherein the second slave is provided on the head section, and
the head section is provided detachably on a slider which is movable on the device main body section.

9. The mounting device according to claim 8,
wherein the multistage slave further comprises a third slave connected between the first slave and the second slave, and
wherein the third slave is provided on a movable section moving device configured to move the head section.

10. A communication disconnection method for a multiplexing device including a multistage slave configured to process data transmitted from a master in an industrial network, and a multiprocessing device configured to multiplex control data transmitted from a first slave of the multistage slave, the first slave being disposed at an upstream side to the master of the multistage slave, and transmit the multiplexed control data to a second slave of the multistage slave by way of a multiplex communication line, the second slave being disposed at a downstream side of the multistage slave, wherein the communication disconnection method comprises:
transmitting, as a notification to the first slave, a disconnection command commanding a disconnection of a communication between the first slave and the multiprocessing device, in response to a disconnection of the multiplex communication line.

* * * * *